March 12, 1968  R. F. CHAMBERS  3,372,668
RUDDER INDICATOR
Filed Aug. 5, 1965
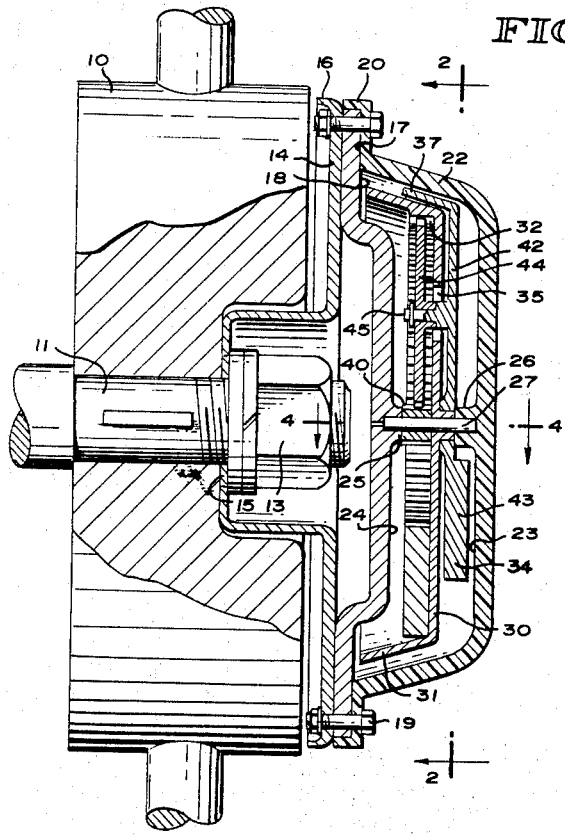
FIG. 1
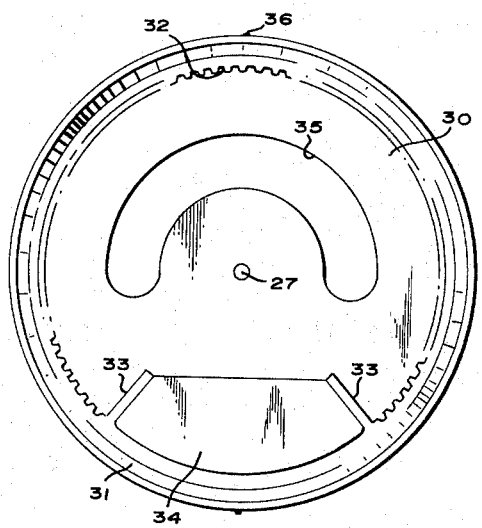
FIG. 3
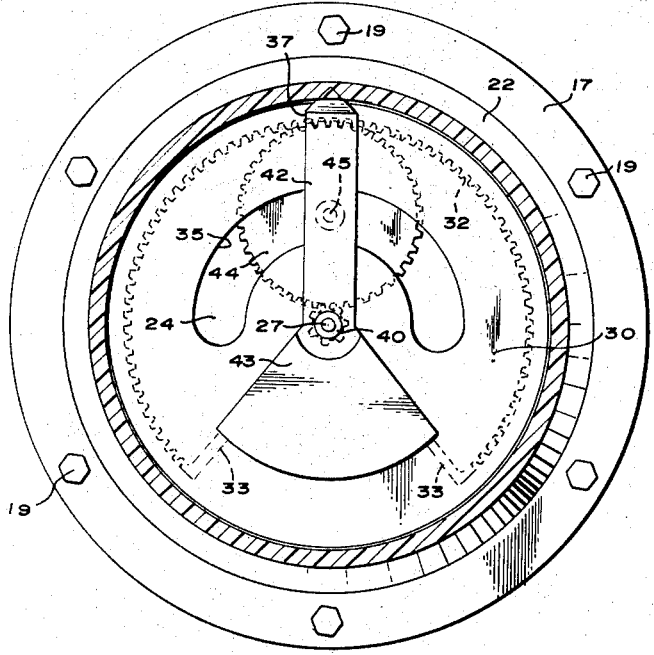
FIG. 2
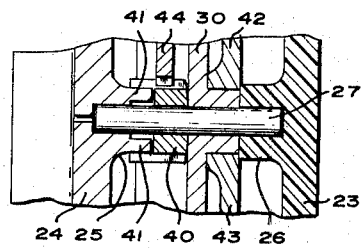
FIG. 4
RALPH F. CHAMBERS
INVENTOR.
BY 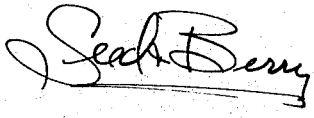
ATTORNEYS Patented Mar. 12, 1968

3,372,668
RUDDER INDICATOR
Ralph F. Chambers, Seattle, Wash., assignor to Chambers & Chambers, Seattle, Wash., a partnership composed of Ralph F. Chambers and Jack E. Chambers
Filed Aug. 5, 1965, Ser. No. 477,418
5 Claims. (Cl. 116—31)

ABSTRACT OF THE DISCLOSURE

A device to indicate to the helmsman of a marine vessel the position occupied by the rudder, employing as a pointer a radial arm which carries the planet gear of an epicyclic train and with the directional bearing visible upon a floating disc weighted so as not to turn with the wheel, the planet gear being in mesh with internal teeth formed upon the disc and a sun gear rotating with the wheel. The entire working assembly is housed in an annular case so attached to the wheel that it can be applied to, adjusted on, or removed from the wheel bodily so as not to expose the working parts.

---

This invention relates to rudder indicators, and for its general object aims to provide a device which mounts upon the steering wheel of a marine vessel and enables the helmsman to visually ascertain the position, directionwise, occupied by his rudder or rudders, and by such information preclude liability of the vessel moving in an undesired direction when the vessel's clutch is engaged. The indicator of the present invention is designed for use on small vessels, pleasure boats powered by inboard engines in particular, and it is a further and important object to engineer into a device for this purpose a system of reduction gearing, planetary in nature. The reduction which this planetary gearing affords permits use of an indicating dial of only moderate span to denote rudder movements which reflect multiple turns of the steering wheel.

Other important objects of the invention are to provide a rudder indicator of simple and inexpensive construction which will efficiently perform its intended function, one which may be easily and quickly mounted upon substantially any size of wheel, one which will give long, maintenance-free and trouble-free service, and one which has an attractive appearance so as to be an ornamental adjunct of the steering wheel on which it is mounted.

These and yet additional objects and advantages in view will appear and be understood in the course of the following description and claims, the invention consisting in the novel construction and in the adaptation and combination of parts hereinafter described and claimed.

In the accompanying drawing:

FIGURE 1 is a longitudinal vertical sectional view illustrating a rudder indicator constructed to embody preferred teachings of the present invention, shown mounted in operating position upon a steering wheel which is shown fragmentarily.

FIG. 2 is a transverse vertical sectional view thereof on line 2—2 of FIG. 1, with the steering wheel deleted.

FIG. 3 is a rear elevational view of the weighted disc member on which the indicating dial appears, shown disassembled from associated parts of the device; and FIG. 4 is a fragmentary horizontal sectional view drawn to an enlarged scale on line 4—4 of FIG. 1.

Referring to said drawings, the numeral 10 denotes a marine vessel's steering wheel characterized in that the shaft 11, through which steering motions are transferred to the rudder or rudders of the vessel, is mounted to turn about a generally horizontal axis. The hub of the wheel is keyed to the shaft and held in place by a nut 13 threading upon an exposed end of the shaft. The rudder indicator of the present invention is housed in a case which overlies the front face of the wheel hub. For the attachment of such case to the wheel, so as to turn in unison therewith, there is provided a centrally cupped annular adapter plate 14 arranged to be clamped by said nut against the hub. In order to accommodate the adapter plate to either of the two shaft diameters most commonly found, the central hole which is provided in the back wall of the plate's cupped portion is formed to a ⅝" diameter and is concentrically scored to provide a surrounding knock-out 15 producing a ¾" hole. The plate is or may be brass, and is stiffened by a circumferential flange 16.

The case for the rudder indicator may be secured to the adapter plate by bolts 19, as here illustrated, or may be attached thereto by fingers which clip over the edge of the plate. The case is fabricated from front and back disc-shaped sections providing, adjacent the periphery, planar annular portions, as 17 and 18, which bear one against the other. Rimming said portion 17, the front section presents a peripheral flange 20 in which the back section finds a piloted fit. The two sections are both desirably molded from plastic, employing Nylon for the back section and a transparent acrylic such as Zereton for the front section, and are cemented one to the other at several spots spaced at intervals of the circumference. To provide within the case a hollow interior with fairly substantial depth, the front section is outwardly dished. A flaring of the surrounding wall 22 gives to said interior the shape of the frustum of a right cone. The back section of the case is dished inwardly in a moderate degree to insure clearance where the shaft 11, or nut 13, may protrude slightly beyond the outer face of the adapter plate.

The facing front and back walls 23 and 24, respectively, for said hollow interior of the case desirably occupy parallel planes normal to the axial line of the case, and each presents at its center a respective boss, as 26 and 25. A spindle 27 has its ends journaled for free relative rotation in center-bores which are provided in said bosses, and there is press-fitted upon the spindle, adjacent to the end thereof which is journaled in the boss 26, a weighted disc 30 molded from Nylon to the illustrated cup shape so as to provide a rearwardly directed peripheral flange 31 having much the same flare as the wall 22 of the case, the diameter being reduced therefrom to leave a space between the two. Internal gear teeth 32 are formed upon said flange, extending concentric to the rotary axis of the spindle through approximately 280°.

At the two end limits of said teeth 32 radial webs 33 are presented. These webs serve as stop walls and additionally function in conjunction with the non-toothed portion of flange 31 to produce a pocket of segmental shape into which the weight for the disc is press-fitted and glued. The weight, denoted by 34, is lead. A cut-out 35 is provided in the facing wall of the disc diametrically opposite from the pocket so as to be in symmetry with the rack of gear teeth. The cut-out is developed concentric to the rotary axis of the spindle through an approximate 180° arc. Upon the exterior face of the flange 31, and diametrically opposite from the pocket in which said weight is received, the disc presents a slightly raised longitudinally extending rib 36 (FIG. 3). Said rib is painted white to serve as the zero reference point of a dial. Tapes (not shown) colored red on one side and green on the other side are or may be adhesively cemented to the dial surface to extend in opposite directions from said zero mark. From a vantage point above the rudder indicator, an operator handling the steering wheel is enabled to view the dial, and an associated pointer 37 hereinafter to be described, through the transparent acrylic which composes the flared wall 22 of the case.

The teeth 32 produce an internal gear which is included together with a sun gear, a planet gear, and a carrier in an epicyclic train. The sun gear, denoted by 40, is journaled for rotation upon the spindle 27, occupying a position between the boss 25 and the disc 30, and is coupled to the case so as to turn in unison therewith by two studs 41 (FIG. 4) projecting from the boss 25 at diametrically opposite sides of the spindle 27. The carrier occupies a position between the disc and the boss 26, receiving a journal bearing from a hub portion of the disc, and is formed to provide two radial arms 42 and 43. Arm 43 is located diametrically opposite from the arm 42 and balances the latter. Arm 42 serves as the carrier proper. Said carrier arm 42 extends upwardly in a vertical plane from its journal axis. The pointer 37 is formed as an upward prolongation of said carrier arm and overlies the dial face of the disc.

Denoted by 44, the planet gear is journaled for rotation upon a pintle 45 to occupy a position to the rear of the disc 30 in mesh with the sun gear 40 and the internal gear 32. The pintle is molded as an integral part of the carrier arm 42 and is accommodated by the arcuate slot 35 of the disc. It has a circumferential groove formed in its outer end. A split ring fits in the groove to hold the planet gear in place upon the pintle.

The carrier and the gears 40 and 44 are or may be molded from Nylon. I find it desirable to cover the inside surface of the front wall of the case with a non-transparent facing. This may take the form of a decal bearing a trademark.

It is thought that the invention, and the manner of its working, will have been understood from the foregoing detailed description of my now-preferred illustrated embodiment of the invention. Assuming that a helmsman has turned the wheel to obtain a right rudder, the planet gear responsively turns in a counter-clockwise direction, as viewed from the vantage point of FIG. 2. This causes the planet gear to "walk" along the internal teeth of the disc in that the latter, while it floats so to speak, is nominally held stationary by the weight 34. The planet gear, as it walks, shifts the carrier to the right and the pointer indicates to the helmsman the degree to which the rudder has been turned.

The helmsman, to obtain a centered rudder, turns the wheel in the opposite direction until the pointer lines up with the zero mark.

Employing teeth with a 64 diametral pitch, 16 teeth on the sun gear and 88 on the planet gear, the motion which is permitted the planet gear between the two extreme limits of the disc's internal teeth accommodates six turns of the steering wheel, i.e. three turns left and three turns right.

It is to be noted that the case in which the working mechanism is housed admits of being rotatively adjusted bodily upon the wheel, which insures that the working parts will not be exposed excepting in the circumstance of the case being opened—for purpose of repair—by "breaking" the cement spots. Such working parts are hence not subject to any liability of damage or disarrangement either when the instrument is being installed upon a wheel or, as a need therefor arises at any time thereafter, being rotatively shifted upon the wheel for purposes of adjustment. There is occasional need for such adjusting in that tiller lines may be taken up to remove slack, or may be re-fastened or replaced, with resulting change in the relationship between wheel and rudder. Adjustment is easily accomplished. The employment of six equidistantly spaced bolts 19 detachably securing the case to the adapter plate 14 permits adjustment in 60° increments. This amount of turn shifts the pointer approximately 2°.

Changes in the details of construction will suggest themselves and can be resorted to without departing from the spirit of the invention and it is accordingly my intention that no limitations be implied and that the hereto annexed claims be given the broadest interpretation to which the employed language fairly admits.

What I claim is:

1. An indicator for the rudder of a marine vessel having said rudder controlled by a steering wheel which is mounted to turn about a horizontal axis and comprising, in combination with the wheel: an adapter plate clamped upon the hub of the wheel, a hollow case comprised of front and back sections of plastic composition fixed one to the other and removably attached to the adapter plate so as to turn in unison therewith, said attachment of the case to the adapter plate permitting the case to be rotatively adjusted bodily upon the plate, a disc housed by the case and supported therefrom for turning motion about an axis coinciding with the rotary axis of the steering wheel, said disc being weighted upon one side of center and having upon the other side a peripheral flange, said flange presenting on its exterior face a zero mark located on a diameter of the disc which is occupied by the latter's weight center and being provided interiorly with a rack of gear teeth developed concentric to the rotary center of the disc and extending equal distances in opposite directions from said diameter, a sun gear also housed by the case and coupled so as to turn therewith about said rotary axis of the wheel, a planet gear lying between and meshing said sun gear and the rack of gear teeth, and an arm serving as a carrier for the planet gear journaled within the case to turn about the rotary axis of the wheel and upon its outer end providing a pointer functional to the zero mark, the case providing a transparent portion through which said pointer and the zero mark are visible to a helmsman handling the steering wheel.

2. A rudder indicator as claimed in claim 1, said front and back sections having a piloted fit one within the other, the case being circular and the fix between said sections comprising cement applied at several spots spaced at intervals of the circumference.

3. A rudder indicator as claimed in claim 2 in which the case presents a peripheral flange which seats against a peripheral portion of the adapter plate, said adjustable mounting for the case comprising a plurality of equidistantly spaced bolts passing through said peripheral portions of the case and plate.

4. A rudder indicator as claimed in claim 1, the planet gear and the carrier arm being located at opposite sides of the weighted disc, and said disc having an arcuate cut-out to accommodate a pintle on which the planet gear is mounted and which is made a rigid part of the carrier arm.

5. A rudder indicator as claimed in claim 4, having a spindle the ends of which are journaled in front and back walls of the case and on which the weighted disc is mounted to give the disc its support, the sun gear being journaled upon the spindle and being coupled to the case by studs located at diametrically opposite sides of the spindle.

References Cited

UNITED STATES PATENTS

| | | | |
|---|---|---|---|
| 2,597,939 | 5/1952 | Lamb | 116—129 |
| 2,845,893 | 8/1958 | Eshbaugh et al. | 116—31 |
| 2,924,022 | 2/1960 | Callahan | 116—129 X |
| 3,165,088 | 1/1965 | Hill et al. | 116—124 X |

SAMUEL S. MATTHEWS, *Primary Examiner.*